July 30, 1963     S. ZURY     3,099,030
RIVET AND BEARING STRUCTURE
Filed May 12, 1961     2 Sheets-Sheet 1

INVENTOR.
STEVE ZURY
BY
*Kenneth E. Walden*
ATTORNEY

July 30, 1963  S. ZURY  3,099,030
RIVET AND BEARING STRUCTURE
Filed May 12, 1961  2 Sheets-Sheet 2

INVENTOR.
STEVE ZURY
BY Kenneth E. Walden
ATTORNEY

United States Patent Office 3,099,030
Patented July 30, 1963

3,099,030
RIVET AND BEARING STRUCTURE
Steve Zury, Gary, Ind., assignor to The Anderson Company, a corporation of Indiana
Filed May 12, 1961, Ser. No. 109,741
11 Claims. (Cl. 15—250.35)

This invention relates generally to windshield wiper apparatus and more particularly is directed to a novel pivotal connection means between various elements comprising the arm or arm-and-blade assembly.

With the windshield wiper apparatus in use today, a great deal of difficulty is encountered, after extended use, because the bearing or pivotal connections wear and permit undesirable pay or slack between the articulated parts. The nature of the service of a wiping arm in the back-and-forth movement imparted thereto by an oscillatory drive shaft of constantly and rapidly changing forces causes excessive wear at the load-bearing surfaces of the usually light channel structural parts comprising the pivot head, arm, pivot joints and connectors of the wiping apparatus. Heretofore the actual pivotal bearing areas were located on the relatively thin surfaces of the formed sheet metal with the result that the relative high unit area pressure and constantly changing direction of motion and forces would cause excessive wear on the mating parts. Once play had developed, the rate of wear and elongation of holes in the channel increases rapidly due to the momentum and impact caused by the constant reversal of movement.

An object of this invention is to overcome the above-mentioned difficulities by the provision of an improved pivot.

Another object of this invention is to provide a more sturdy and improved assembly of parts.

A further object of this invention is to provide broader bearing surfaces.

A still further object of this invention is to provide for metal flow during assembly of a joint connection creating an improved joint.

Other objects and advantages of this invention will become apparent after the description to follow is studied in conjunction with the drawings.

In the accompanying drawings like reference numerals indicate like parts and illustrate a presently preferred embodiment wherein.

Figure 1:
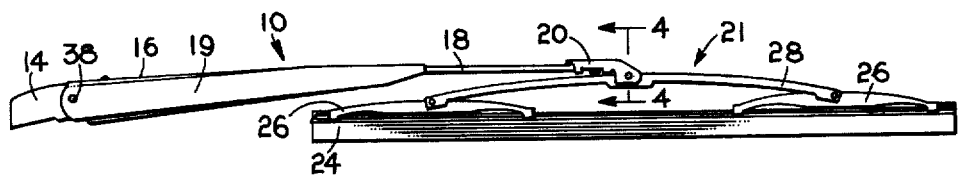
FIGURE 1 is a side view in elevation of a windshield wiper apparatus, the pivot joints of which carry my invention.

Referring primarily to FIGURE 1 wherein is shown windshield wiper apparatus, generally designated 10, supporting a blade 24 for wiping a windshield (not shown). The apparatus is comprised of a pivot head 14 or member having pivotally received thereon by rivet 38 a channel member 16 having a back portion and substantially parallel planar side portions 19, an elongate arm 18 or member extending linearly from channel 16 and being provided at its outer end with an arm connector 20. The pivot head 14 is adapted to be received on an oscillating drive shaft (not shown) within splined drumhead 22. Head 14 is also provided with a leaf spring 11 which is adapted to snap underneath a drumhead on a pivot drive shaft to hold the head 14 and pivot drive shaft assembled. The arm connector 20 is designed to receive the windshield wiper blade assembly designated generally by the numeral 21. Assembly 21 is comprised of the wiping blade 24 held in position by a pair of secondary yokes or pressure-transmitting means 26 which in turn are pivotally connected near their mid-point to a respective end of a primary yoke or secondary pressure-transmitting means 28. It is further pointed out that yoke 28 is operatively retained in position by arm connector 20 which as mentioned is located at the outer end of arm 18. Oscillation of a drive shaft through pivot head 14 imparts a back-and-forth arcuate motion through the arm 18 to the wiper assembly 21. Blade 24 is adapted to be urged into contact with the surface of a windshield by the action of a tension spring 13 which is operatively anchored at one end to a pin 15 on head 14, and at the other end to a similar pin (not shown) on channel member 16.

During the period of oscillation of the drive shaft and the resulting reverse movement of wiper assembly 21, strain is developed in all the interconnected parts and excessive wear results between any moving surfaces such as the pivot joints between head section 14 and channel 16, or between the arm connector 20 and primary yoke 28.

I have now broadly disclosed and described the apparatus proving a setting for my improvement, and I shall now proceed with a more detailed description of the specific apparatus employed to overcome the difficulties mentioned.

Figure 2:
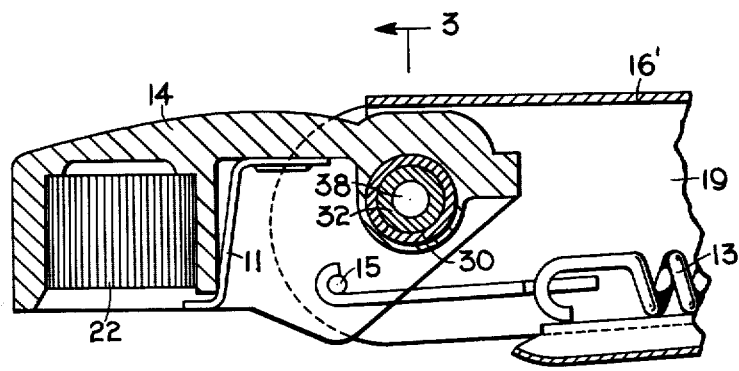
FIGURE 2 is an enlarged cross-sectional view taken through the pivot head and arm joint of FIGURE 1.
Figure 3:
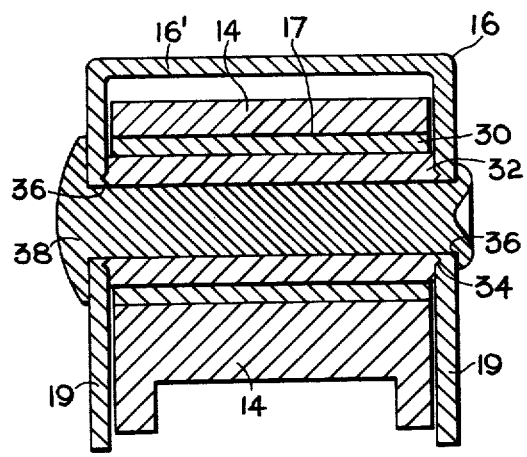
FIGURE 3 is an enlarged sectional view taken substantially along line 3—3 of FIGURE 2.

Referring particularly to FIGURE 3, which is a cross-sectional view along line 3—3 of FIGURE 2, where is disclosed one of the specific improvements of the bearing arrangement at the pivot. FIGURE 3 shows the pivot head 14, previously disclosed, which is designed to be received on the oscillatory drive shaft; and a channel portion 16 which is formed in a U-shape having a back portion 16' and substantially parallel flanges or side portions 19. Pivot head 14 is received between the flanges in pivotal relation therewith by means of rivet 38 and other elements to be further described.

Figure 7:
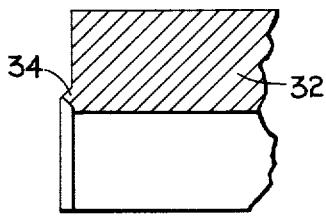
FIGURE 7 is an enlarged sectional view through the pivot sleeve showing one of the important features.

The pivot head 14 has a transverse opening 17 provided with a press-fitted bushing or cylindrical sleeve 30 extending therethrough to provide a pivotal bearing surface. A hardened hollow steel sleeve or tubular element 32 of cylindrical shape is adapted to extend through the bushing 30 in free pivotal bearing relation therewith. Sleeve 32 being somewhat longer than bushing 30 is substantially the same length as the distance between flanges 19 of channel member 16. However, as best shown in FIGURE 7, each end of the steel sleeve 32 is provided with an axially extending circumferential protrusion or rim 34 for a purpose to be more fully described. The overall length of sleeve 32, including axial protrusions 34, is slightly greater than the distance between flanges 19. Protrusions 34 extend axially from each end of sleeve 32 and terminate in a sharp substantially 90-degree edge circumferentially disposed around the cylindrical hollow portion. Steel sleeve 32 (see FIGURE 3) is located between and normal to flanges 19 of channel member 16. Flanges 19 are provided with a pair of transverse openings 36 with which the opening in sleeve 32 aligns. A rivet 38 is snugly received through openings 36 of flanges 19 and hollow sleeve 32.

Figure 6:
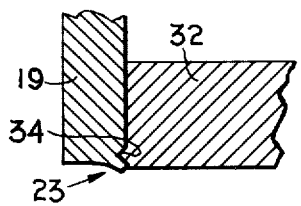
FIGURE 6 is a greatly enlarged sectional view for illustrative purposes showing an uninhibited metal flow upon assembly of parts.

Upon assembly of the pivot head 14 and channel 16, sleeve 32 and straight rivet 38 are placed in position and rivet 38 upset whereupon the elements take the relative position as best illustrated in FIGURE 3. As clearly shown in FIGURES 3 and 6, the hard, sharp axial protrusions 34 at each end of sleeve 32 are embedded into the inner face of flanges 19 causing a flow of a relatively softer metal radially into opening 36. FIGURE 6 best illustrates in exaggerated form this flow of metal resulting from an axial force causing axial protrusions 34 to be embedded into flanges 19.

It is readily apparent that when a rivet 38 is in position within sleeve 32 and openings 36, that the flowing metal as indicated at 23 will converge from all sides onto the periphery of rivet 38 to hold the rivet fast therein. It can be seen that the above-described flow, coupled with the actual upsetting of the rivet, serves to securely fix rivet 38 and steel sleeve 32 in fixed position in channel 16. Bushing 30 previously described as pressed into position through hole 17 in pivot head 14 receives hardened steel sleeve 32 with enough clearance to permit pivotal movement therebetween.

It can readily be seen that I have invented an improved pivotal joint for use between the pivot head and arm of a windshield wiper which has the advantage of providing the bearing surface of a sleeve and bushing with a relatively large bearing area where the unit pressure will be low. Since the steel sleeve 32 and rivet 38 are securely held with respect to channel 16, the usual wear and looseness developing between the rivet 38 and holes 36 in side walls or flanges 19 does not occur.

In a similar manner the pivot connection between the arm connector 20 and primary yoke 28 can be provided with these improvements which increase the bearing area between pivotal parts to lessen the unit load and the resulting wear and looseness between the parts.

Figure 4:
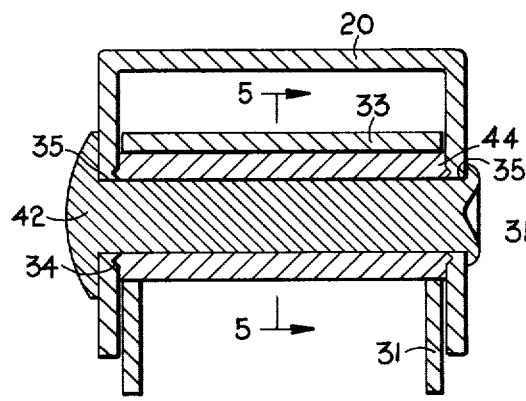
FIGURE 4 is a greatly enlarged detail view of a section through the pivot connection at 4—4 of FIGURE 1.
Figure 5:
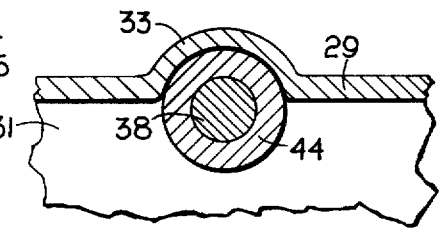
FIGURE 5 is a sectional view along the line 5—5 of FIGURE 4.

FIGURES 4 and 5 disclose the features of my invention applied between arm connector 20 and primary yoke 28. Yoke 28 is of a channel shape having a back portion 29 and side portions or flanges 31. Back portion 29 has a transverse raised deformation 33 in axial alignment with a pair of holes 35 in side flanges 31. In a manner similar to the disclosure in FIGURE 3, a hardened hollow cylindrical sleeve 44 having axially extending protrusions 34 is embedded into the inside of flanges 31, thus causing a flow of metal radially inwardly into and around rivet 42 as the rivet is clenched. It is apparent that sleeve 44 and rivet 42 are fixedly held with respect to the side flanges 31 of end connector 20, and that a bearing surface is created between deformation 33 and sleeve 44. The bearing area at this joint is relatively large resulting in less wear between the parts as the wiper operates back and forth across a windshield.

It is important that the impact upsetting the rivets 38 and 42 be sufficient to drive edge 34 of sleeve 32 or 44 into the inside of the flanges 19 or 31 to cause metal in the flanges to flow radially into holding contact with the rivet whereby no play or looseness is permitted therebetween. The steel sleeve being embedded into the flange is likewise restrained from transverse movement.

Figure 8:
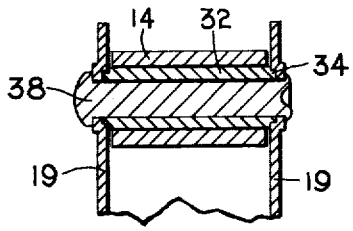
FIGURE 8 is an alternate form of the pivot sleeve.
Figure 9:
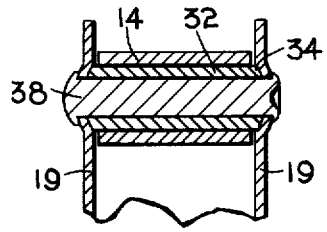
FIGURE 9 is a still further form of the pivot sleeve.

FIGURES 8 and 9 each disclose different shapes of axial protrusions 34 to accomplish a flowing of the metal around rivet 38 to hold it securely in position. Likewise transverse movement of sleeve 32 relative to flanges 19 is prevented.

In each instance involving pivotal connections in use with a windshield wiper arm and blade, I have provided a means of causing metal flow to hold certain elements in relatively fixed position so as to provide a broad bearing surface between other elements for a more sturdy construction to avoid excessive wear.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper arm subassembly comprising, an elongate arm terminating at one end in a pair of substantially parallel planar portions provided with aligned apertures, an elongate tubular element disposed normally between inner surfaces of the planar portions and aligned with the apertures, said element having an edge portion extending axially from each end terminating adjacent an inner surface, and an elongate fastener extending through the tubular element and through the apertures and having ends clamped against the outer surfaces of the planar portions to forcibly embed said edge portions into said inner surfaces to secure the tubular element against movement with respect to the planar portions of the elongate arm to provide a pivot adapted to be freely pivotally received by another member.

2. A windshield wiper arm subassembly comprising, an elongate arm terminating at one end in a pair of substantially parallel planar portions provided with aligned apertures, an elongate tubular element disposed normally between inner surfaces of the planar portion and having its axis aligned with the apertures, said element having an edge portion extending axially from each end terminating adjacent an inner surface, and an elongate fastener extending through the tubular element and through the apertures and having ends clamped against the outer surfaces of the planar pjortions to forcibly embed said edge portion into said inner surfaces to secure said tubular element against movement with respect to said planar portions of said elongate arm, said embedding of said edge portions into said inner surfaces causing radial flow of metal in said planar portions into said apertures fixedly securing said elongate fastener therein whereby the tubular element is adapted to be freely pivotally received by another member.

3. A windshield wiper arm comprising, a pivot head adapted to receive a driving member, said pivot head being provided with a bearing means, an elongate arm terminating at one end in a pair of substantially parallel portions positioned astride the pivot head and having apertures in alignment with the bearing means, an elongate tubular element disposed normally between inner surfaces of said parallel portions in free pivotal relation with the bearing means and having its axis aligned with said apertures, said elongate tubular element having an annular portion extending axially from each end thereof terminating adjacent a respective parallel portion of said elongate arm, and elongate fastening means extending through the tubular element and through the apertures and having ends clamped against said outer surfaces of said parallel portions to forcibly embed said annular portions into said parallel portions to secure the tubular element against relative movement with respect to said parallel portions, said embedding of said annular portions into said inner surfaces about said apertures causing radial flow of metal of said parallel portions into said apertures so as to fixedly secure the elongate fastener therein, thereby establishing a freely pivotal connection only between the elongate tubular element and the bearing means.

4. A windshield wiper arm comprising, a first part being provided with a bearing means, a second part pivotally receiving the first part, said second part having at one end a pair of opposed portions disposed astride the bearing means of the first part, a sleeve bearing member positioned normally between the opposed portions in pivotal bearing relation with the bearing means of the first part, and elongate fastening means extending through the sleeve in engagement with the sleeve and opposed portions to fixedly secure the sleeve with respect to the opposed portions, said sleeve member having a sharp axial protrusion on at least one end adapted upon assembly with a respective opposed portion to axially embed itself into said portion fixedly securing itself therewith.

5. A windshield wiper arm comprising, a first part having a bearing means, a second part comprising an elongate arm having a pair of substantially parallel planar portions astride said bearing means of said first part, a hardened sleeve located normally between inner faces of the planar portions and freely pivotally received within said bearing means of the first part, said hardened sleeve terminating at each end in a sharp axial protrusion adapted to be embedded into the inner face of a respective planar portion upon assembly to secure said sleeve to said portions, and a fastening means extending through said sleeve and planar portions and clamped against outer faces of the latter thereby locking said sleeve in a fixed position between said planar portions.

6. A windshield wiper arm comprised of a first part and a second part, said first part having a cylindrical bearing means extending therethrough, said second part comprising an elongate arm portion terminating at one end in a pair of substantially parallel planar portions disposed astride said bearing means, said planar portions having a pair of transversely aligned apertures, a hardened hollow cylindrical sleeve positioned concentrically of said apertures and normally between inner faces of said planar portions and extending through said bearing means of the first member to form a freely pivotal connection therewith, said hollow sleeve having a pair of axially directed sharp protrusions respectively terminating adjacent inner faces of said planar portions, an elongate fastening means disposed within said sleeve and extending through said apertures in said planar portions and having ends clamped thereagainst to force said sleeve protrusions to be fixedly embedded into said inner faces to cause radial metal flow of said planar portions into said openings containing said elongate fastening means.

7. A pivot joint for relatively movable sections of a windshield wiper arm comprising: a first section having cylindrical bearing means therein, a second section having tubular means adapted to be freely pivotally received in the cylindrical bearing means of the first member, said second section provided with spaced-apart portions adapted to receive the tubular means therebetween in axial alignment with an aperture in each portion, said tubular means having axial protrusions disposed adjacent the apertures, means disposed in the tubular means and through the apertures and adapted to be upset so as to axially embed the axial protrusions into the spaced-apart portions and become relatively fixed thereto whereby to establish a pivotal connection for the sections only between the tubular means and the cylindrical bearing means.

8. The structure of claim 7 wherein the embedding of the axial protrusions into said spaced-apart portions causes radial flow of material into the apertures therein for holding contact with the third-mentioned means.

9. A pivot for connecting relatively movable sections of a windshield wiper arm comprising: a first section having first bearing means therein, a second section provided with spaced-apart portions having axially aligned apertures disposed on opposite sides of the first bearing means, second bearing means freely received in the first bearing means and between the spaced-part portions in axial alignment with the apertures, and means received by the second bearing means and extending through the apertures and adapted to be upset to clamp the second bearing means between the spaced-apart portions said second bearing means provided with a contour on at least one of its extremities adjacent a respective spaced-apart portion adapted to deform said portion for additional holding relation therewith thereby establishing a pivotal connection for the sections only between the first and second bearing means.

10. Structure of the kind described comprising a first elongate section provided with an opening extending transversely therethrough, a second section having side walls straddling said first section and provided with apertures aligned with said opening, an elongate member extending into said opening and having ends provided with means disposed in juxtaposed relation to inner faces of said side walls, and means carried by said member provided with portions forcibly engaging outer faces of said side walls serving to simultaneously effect a fixed interlocking connection between said means on said member and said inner faces and a freely movable pivotal connection between said sections.

11. Structure of the kind described comprising an elongate first section provided with an opening extending transversely therethrough, a second section having a pair of side walls straddling said first section and having outwardly extending recesses provided with apertures aligned with said opening, an elongate member disposed in said opening and having ends seated in said recesses, and means connected to said member having portions forcibly engaging outer surfaces of said side walls serving to simultaneously effect a fixed interlocking connection between said ends and the material defining said recesses and a permanent pivotal connection between said sections.

References Cited in the file of this patent

UNITED STATES PATENTS

| 1,208,861 | Trimble | Dec. 19, 1916 |
| 2,844,838 | Krohm | July 29, 1958 |
| 2,850,755 | Deibel | Sept. 9, 1958 |

UNITED STATES PATENT OFFICE
CERTIFICATE OF CORRECTION

Patent No. 3,099,030            July 30, 1963

Steve Zury

It is hereby certified that error appears in the above numbered patent requiring correction and that the said Letters Patent should read as corrected below.

Column 1, line 15, for "pay" read -- play --; column 4, line 21, for "portion" read -- portions --; line 27, for "pjortions" read -- portions --; column 5, line 1, after "portions" insert -- positioned --; column 6, line 13, after "portions" insert a comma.

Signed and sealed this 15th day of September 1964.

(SEAL)
Attest:

ERNEST W. SWIDER            EDWARD J. BRENNER
Attesting Officer            Commissioner of Patents